United States Patent Office 2,949,492
Patented Aug. 16, 1960

2,949,492

PREPARATION OF ALKARYL HYDROCARBONS

Leo James Weaver, Creve Coeur, Mo., assignor to Monsanto Chemical Company, St. Louis, Mo., a corporation of Delaware No Drawing. Filed June 18, 1958, Ser. No. 742,724

3 Claims. (Cl. 260—671)

This invention relates to the production of alkaryl hydrocarbons. More particularly, the invention relates to an improved process whereby alkaryl hydrocarbons are produced by alkylating aromatic hydrocarbons with olefin polymers in the presence of catalysts of the Friedel-Crafts type.

The general class of reactions whereby aromatic hydrocarbons are alkylated with olefin polymers in the presence of Friedel-Crafts catalysts is well known in the prior art, examples of such prior art being U.S. 2,232,118, U.S. 2,477,382, and U.S. 2,813,917. The disclosures of those patents are hereby incorporated herein by reference in order to obviate the necessity for repeating all of the details relating to this type of reaction.

Very briefly reviewed, the type of reaction to which the present invention is related is that in which an alkylated hydrocarbon is produced by alkylating an aromatic hydrocarbon such as benzene, toluene, xylene, ethylbenzene, naphthalene, methylnaphthalene, etc., with an olefin polymer. The olefin polymers are obtained by well known procedures for polymerizing olefins such as butylene, propylene, ethylene, etc., including mixtures thereof, in the presence of a catalyst such as hydrogen fluoride, sulfuric acid, phosphoric acid, aluminum chloride, boron trifluoride, aluminum silicates, etc. This olefin polymerization is not a simple and straightforward polymerization, but is accompanied by cracking, reformation and alkylation reactions. Thus, the resulting olefin polymers are not limited to molecular species containing only multiples of the number of carbon atoms in the olefin monomer, but instead will include numerous species having intermediate numbers of carbon atoms. For example, a polymer of propylene is not made up only of molecules containing 6, 9, 12 or 15 carbon atoms, but also includes molecules containing 7, 8, 10, 11, 13, 14, etc. carbon atoms. Furthermore, the resulting olefin polymer is not made up solely of monoolefins, but also includes di- and poly-olefinic molecules. In view of the foregoing, the polymer obtained from olefin polymerization is generally fractionated in order to obtain a narrower range of molecular weight species with which to carry out the alkylation of the aromatic hydrocarbon. Thus, for example, in making dodecylbenzene from a propylene polymer the propylene polymerization product is generally fractionated, and only that portion boiling between about 175° C. and about 235° C. is utilized to make the dodecylbenzene.

The particular alkylation processes to which the present invention is applicable are those in which alkaryl hydrocarbons containing from about 5 to about 20 carbon atoms in the alkyl groups are produced by reaction between the aforesaid aromatic hydrocarbons and the aforesaid olefin polymers in the presence of Friedel-Crafts type catalysts comprising the metal halides and hydrogen fluoride. Examples of suitable metal halide catalysts are the group II metal halides, such as zinc chloride; the group III halides, such as boron trifluoride, boron, trichloride, boron tribromide, aluminum trichloride, aluminum tribromide, aluminum triiodide, gallium trichloride and scandium trichloride; the group IV halides, such as titanium tetrachloride, titanium tetrabromide, stannic chloride and stannic bromide; the group V halides, such as antimony trichloride, antimony pentachloride, antimony tribromide and bismuth trichloride; and others such as ferric chloride. The foregoing alkylation reactions, like all catalyzed alkylation reactions, result in the formation of a mixture of various alkaryl hydrocarbons and a hydrocarbon-metal halide complex commonly referred to as a catalyst complex or catalyst sludge. The catalyst sludge resulting from the aforementioned alkylation reaction is an important part of the present invention—as will be explained in greater detail below.

As in the case of the catalyzed olefin polymerization, the foregoing alkylation reaction is not a simple reaction whereby each olefin molecule is merely condensed upon an aromatic nucleus to give an alkyl hydrocarbon in which the alkyl group corresponds to the original olefinic polymer. On the contrary, during the alkylation reaction there occurs a considerable number of side reactions involving cracking, rearrangement, etc. of the olefin polymers and the alkyl side chains of the alkaryl hydrocarbons, so that the resulting alkyl groups of the alkaryl hydrocarbons cover a wide spectrum of molecular weights and molecular configurations. Since all of the resulting alkaryl hydrocarbons are not equally desirable, the alkaryl hydrocarbon alkylation product is thereafter fractionated to separate the less desirable from the more desirable fractions. For example, when dodecylbenzene is the desired product the total alkylation product is generally fractionated to recover only that fraction boiling between about 260° C. and about 315° C. The lower boiling and higher boiling fraction (corresponding to the shorter and longer alkyl side chain reaction products) often constitute as much as 15 or 20% of the total alkylation reaction product, and represent a waste by-product insofar as dodecylbenzene production is concerned.

Accordingly, the principal object of the present invention is to provide an improved method for carrying out alkylation reactions of the type described above so that the undesirable side reactions are minimized—and so that the distribution of chain length of the allkyl groups in the resulting alkaryl alkylation product correspond more closely to the distribution of chain lengths of the olefin polymer used in the alkylation reaction.

The foregoing objects are achieved by intimately contacting the olefin polymer, prior to introduction of the alkylation reaction zone, with a suitable quantity of the catalyst complex or suldge which results from such an alkylation reaction. While the reasons for the improvement obtained by this prior treatment of olefin polymer are not completely understood, it is believed that the pretreatment with catalyst sludge is beneficial at least in part by (1) removal of catalyst poison type materials such as peroxidation and decomposition products of polymerization inhibitors which may have been added subsequent to the olefin polymerization and/or (2) by removal of diolefins and/or olefins which have structures such as RR'C=CH$_2$—all of which tend to increase or accentuate undesirable side reactions occurring during the alkylation process. The removal of the RR'C=CH$_2$ type olefin by treatment with the catalyst sludge is probably effected by an alkylation reaction with aromatic hydrocarbons in the complex. Regardless of the correctness of the foregoing hypothesized mechanism, the actual benefits derived from the treatment are readily recognized from the following example.

Example

A typical alkylation reaction carried out with benzene and a tetrapropylene fraction boiling between 177° C. and 213° C. (prepared by polymerization of propylene in the presence of a phosphoric acid catalyst) and utilizing aluminum trichloride as the alkylation catalyst, gave an alkylation product containing 79.9 weight percent of dodecyclbenzene fraction boiling between 78° C. and 160° C. @ 2 mm. Hg, 10.7 weight percent of a lighter fraction boiling between 55° C. and 115° C. @ 20 mm. Hg, and 9.4 weight percent of a heavier fraction boiling above 160° C. @ 2 mm. Hg. This alkylation procedure was then duplicated in all respects except that the propylene polymer feed was first treated with 10 weight percent of catalyst complex resulting from a prior alkylation reaction with the same ingredients. The treatment was carried out at 25° C. by vigorously agitating the mixture of catalyst complex and olefin for about 15 minutes and then allowing them to separate for about one hour. The resulting alkylation reaction product contained 81.9 weight percent of dodecylbenzene fraction, 9.0 weight percent of the lower boiling fraction, and 9.1 weight percent of the higher boiling fraction. Thus, it is readily apparent that as a result of the pretreatment of olefin polymer with catalyst complex the amount of undesirable side reaction by-products was reduced by more than 10% (i.e., from 20.1% to 18.1% of the total alkylation product).

It should be recognized that the conditions for catalyst complex/olefin polymer contacting can be varied somewhat from those described in the preceding example, while still retaining the benefits obtained therefrom. Thus, for example, the catalyst sludge/olefin polymer ratio can be varied from as high as 1/1 to as low as 1/100, but will preferably be maintained between about 1/5 and 1/20. Likewise, the temperature at which the olefin polymer and catalyst complex are contacted may range from as low as 0° C. to as high as 80° C., but will preferably be maintained between about 15° C. and 60° C. Whatever purification mechanism takes place proceeds quite rapidly, so that the time of contacting is not particularly critical. It is important, however, that the contacting be thorough—such as can be obtained in a stirred or otherwise agitating mixing messel, or by passing the two materials together in turbulent flow through a mixing nozzle.

It will be readily recognized that some catalyst complexes may have sufficient residual catalytic activity that further polymerization of the olefin polymers could be carried out under proper conditions of time, temperature, catalyst complex/olefin ratio, etc. Such polymerization reactions would adversely affect the process of the present invention; consequently care should be exercised in selecting nonpolymerizing conditions for contacting the olefin polymer and catalyst complexes according to this invention.

What is claimed is:

1. In a process for producing alkaryl hydrocarbons containing from 5 to 20 carbon atoms in the alkyl group, whereby an aromatic hydrocarbon and an olefin polymer are introduced into an alkylation zone and reacted in the presence of a Friedel-Crafts alkylation catalyst selected from the group consisting of hydrogen fluoride and metal halides, with consequent formation of and subsequent removal from said alkylation zone of an alkaryl hydrocarbon and a spent catalyst complex, the improvement which comprises intimately contacting said olefin polymer with spent catalyst complex prior to introduction of said olefin polymer into said alkylation zone.

2. The process of claim 1 in which the olefin polymer is a propylene polymer and in which the catalyst is an aluminum halide.

3. The process of claim 1 wherein the olefin polymer is a propylene polymer having an average of 12 carbon atoms per molecule, in which the catalyst is aluminum trichloride, and in which the contacting of polymeric olefin and catalyst complex is carried out at a temperature between about 15° C. and about 60° C.

References Cited in the file of this patent

UNITED STATES PATENTS

| | | |
|---|---|---|
| 2,349,211 | Tulleners | May 16, 1944 |
| 2,479,120 | Johnstone | Aug. 16, 1949 |
| 2,488,190 | Hepp | Nov. 15, 1949 |
| 2,559,818 | Hanmer | July 10, 1951 |
| 2,567,854 | Nixon | Sept. 11, 1951 |
| 2,813,917 | Sharrah | Nov. 19, 1957 |